(12) United States Patent
Boone

(10) Patent No.: US 6,415,710 B1
(45) Date of Patent: Jul. 9, 2002

(54) GREASE COLLECTION SYSTEM

(76) Inventor: Gary Roger Boone, HC 73, Box 87, Alderson, WV (US) 25901

( * ) Notice: Subject to any disclaimer, the term of this patent is extended or adjusted under 35 U.S.C. 154(b) by 0 days.

(21) Appl. No.: 09/877,494

(22) Filed: Jun. 8, 2001

(51) Int. Cl.[7] .............................. A47J 37/00; A47J 37/06
(52) U.S. Cl. .............................. 99/446; 99/375; 99/400; 99/425; 99/444
(58) Field of Search ........................... 99/331, 353, 339, 99/340, 372, 375, 380, 349, 400, 401, 422–425, 444–450, 373, 374; 219/401, 524, 525, 521, 386; 126/25 R, 9 R; 426/523

(56) References Cited

U.S. PATENT DOCUMENTS

| | | | | |
|---|---|---|---|---|
| 2,321,676 A | * | 6/1943 | Hennessy | 99/425 |
| 3,369,481 A | * | 2/1968 | Pappas | 99/445 |
| 3,593,648 A | * | 7/1971 | Walters | 99/349 |
| 3,664,256 A | * | 5/1972 | Peirce | 99/425 |
| 3,719,507 A | * | 3/1973 | Bardeau | 99/375 |
| 3,842,726 A | * | 10/1974 | Fautz | 99/445 X |
| 4,034,663 A | * | 7/1977 | Jenn et al. | 99/448 |
| 4,403,540 A | * | 9/1983 | Erkelenz | 99/375 |
| 4,972,766 A | * | 11/1990 | Anetsberger | 99/379 X |
| 5,606,905 A | * | 3/1997 | Boehm et al. | 99/400 X |
| 5,884,555 A | * | 3/1999 | Chang | 99/425 |
| 6,016,741 A | * | 1/2000 | Tsai et al. | 99/375 X |
| 6,186,054 B1 | * | 2/2001 | Hung | 99/444 X |

* cited by examiner

Primary Examiner—Timothy F. Simone
(74) Attorney, Agent, or Firm—Henderickson & Long, PLLC; Stephen M. Schwartz

(57) ABSTRACT

A grease collection system is disclosed for use with a generally portable cooking device of the type designed to isolate grease and other liquids released from food during the cooking. process, said cooking device having a cooking chamber with a grease discharge area through which said grease and other liquids may exit said cooking chamber in a generally continuous flow during the cooking process. A top member is provided with a slot therethrough. A plurality of support means engage said top member so as to provide sufficient clearance such that a grease collection tray may be slidably positioned thereunder. In practice, said cooking device is positioned on said top member such that said slot is vertically disposed below said grease discharge area and said grease collection tray is further vertically disposed below said slot. As the cooking process proceeds, the grease and other liquids discharged from said cooking device through the grease discharge area fall through said slot into said grease collection tray where the grease and other liquids are collected and stored until the cooking process has been completed.

9 Claims, 4 Drawing Sheets

GREASE COLLECTION SYSTEM

CROSS REFERENCE TO RELATED APPLICATIONS

None

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Of increasing popularity are various types of cooking devices designed to isolate grease and other liquids released from food during the cooking process. Typical of these types of cooking devices are disclosed in U.S. Pat. No. 5,606,905 issued to Boehm and Johnson on Mar. 4, 1997, and U.S. Pat. No. 6,016,741 issued to Tsai and Hu on Jan. 25, 2000. In each of these cooking devices, the food is placed in a cooking chamber having at least one lower portion thereof. As the food is being cooked, there is a continuous flow of hot grease and other liquids released from the food to said lower portion of the cooking chamber. The grease and other liquids exit the cooking chamber through a grease discharge area and must then be collected and stored until the cooking process is completed.

To collect and store the grease and other liquids during the cooking process, both the Boehm/Johnson cooking device and the Tsai/Hu cooking device disclose a simple tray having an open top and being of slight dimensions. In practice, said tray is positioned below the grease discharge area located at the lower end of the cooking chamber such that the grease and other liquids, while still hot, continuously flow out of the cooking chamber through the grease discharge area and drop into the open tray. As more grease and other liquids are released from the food and flow out of the cooking chamber into said tray, the temperature of the grease and other liquids thereby collected is maintained at a high and dangerous level. It is therefore a disadvantage of these cooking devices that the slight dimensions and the open top of said tray makes it possible for the hot grease and other liquids to overflow, spill or splatter in an uncontrolled manner in the event, for example, that excessive amounts of grease or other liquids should be released from the food, that the tray or its surrounding means of support are bumped, jarred, or otherwise disturbed or some outside foreign object is dropped or otherwise introduced into said tray thereby causing potential injury to the operator or other bystander and increasing the amount of cleanup necessary after the use of the cooking device. It is a further disadvantage of these cooking devices that, once the tray has become full or the cooking process is ended, the operator must carefully remove and balance said tray during transit to the place where said tray is to be emptied of said grease and other liquids in order to avoid introducing any type of wave action to the grease and other liquids thereby increasing the possibility of spillage or injury.

BRIEF SUMMARY OF THE INVENTION

It is an object of this present invention to provide a safe, effective and convenient means for collecting and storing grease and other liquids released from food by those cooking devices designed to discharge said grease and other liquids through a grease discharge area during the cooking process.

It is a further object of this present invention to provide a safe, effective and convenient means for transporting the grease and other liquids which have been collected and stored during the cooking process to a place where said grease and other liquids may be disposed of.

These and other objects of the invention are accomplished by providing a grease collection system having a top member, a slot located in said top member, a plurality of support means and a grease collection tray. The top member preferably has sufficient dimensions and strength to support a cooking device of the type heretofore described. The slot is positioned in said top member such that said slot is disposed directly below the grease discharge area of the cooking device. In addition, the slot has sufficient dimensions to allow all grease and other liquids discharged from the cooking device to pass freely therethrough.

The plurality of support means engage the top member such that sufficient clearance is created thereunder for the grease collection tray to be slidably positioned below said top member as hereinafter described. Preferably, the plurality of support means include walls such that the area below said top member has enclosed sides to prevent the uncontrolled spill or splatter of hot grease and other liquids collected and stored during the cooking process thereby increasing the safety of the present invention. However, those skilled in the art will recognize that legs or other support means may be utilized to provide sufficient clearance for the grease collection tray as heretofore described.

During the cooking process, the grease collection tray is vertically disposed below the slot in said top member and thereafter is slidably removed from below said top member for transit to the place where said grease collection tray is to be emptied. The grease collection tray has sufficient dimensions to collect all grease and other liquids dropping through said slot and, further, to provide sufficient storage capacity for said grease and other liquids released from food during a typical cooking cycle such to prevent overflow and spillage during the cooking process and subsequent transit of said grease collection tray.

In the preferred embodiment of the present invention, a grease collection tray drawer is further provided, said drawer being dimensioned such to removably receive said grease collection tray. In practice, when the cooking cycle has been completed, the operator removes the drawer with the grease collection tray contained therein thereby preventing direct contact with the grease collection tray and increasing operator safety. Once the grease collection tray is sufficiently cool, said grease collection tray is removed from said drawer and may then be emptied and cleaned.

An alternative design of the present invention includes grease directing means positioned on the top member adjacent to and along the perimeter of the slot. Said grease directing means has a generally downward sloped inner side such that said grease and other liquids dropping from the grease discharge area of the cooking device are thereby directed into said slot. A further alternative design of the present invention includes means for locating and engaging the cooking device such that said cooking device is held in a fixed position with the grease discharge area directly above the slot. A yet further alternative design of the present invention includes a utensil tray for receiving and holding soiled utensils used during the cooking process, said utensil tray being removably mounted in the top member adjacent to the position of the cooking device. A yet further alternative design of the present invention includes a bottom member fixably mounted below the support means of said top member thereby providing a secure base for the grease collection tray or grease collection tray and drawer combination and providing a further enclosed area for the grease collection tray to prevent the uncontrolled spill or splatter of hot grease and other liquids collected and stored during the cooking process. A yet further alternative design of the present invention includes a plurality of electric receptacles with or without an on/off switch to provide a convenient means of supplying power to the cooking device and other appliances which may be used nearby thereby increase the portability and usefulness of the grease collection system. Those skilled in the art will recognize that these alternative design features may be included in any combination thereof in the present invention.

DETAILED DESCRIPTION OF THE INVENTION

Figure 1:
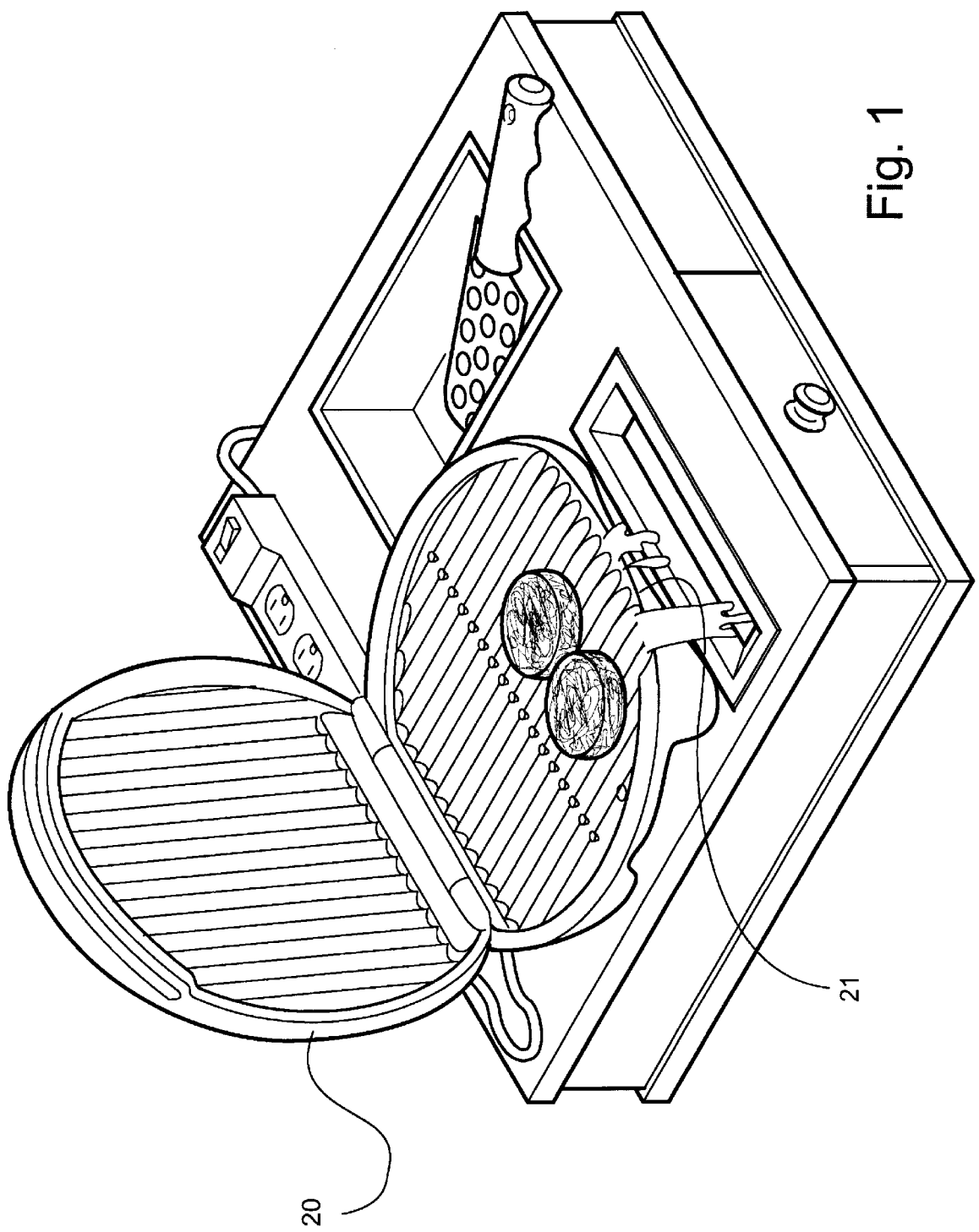
FIG. 1 is a perspective view of a grease collection system according to the present invention further showing the interrelation during use of a cooking device with the grease collection system.
Figure 3:
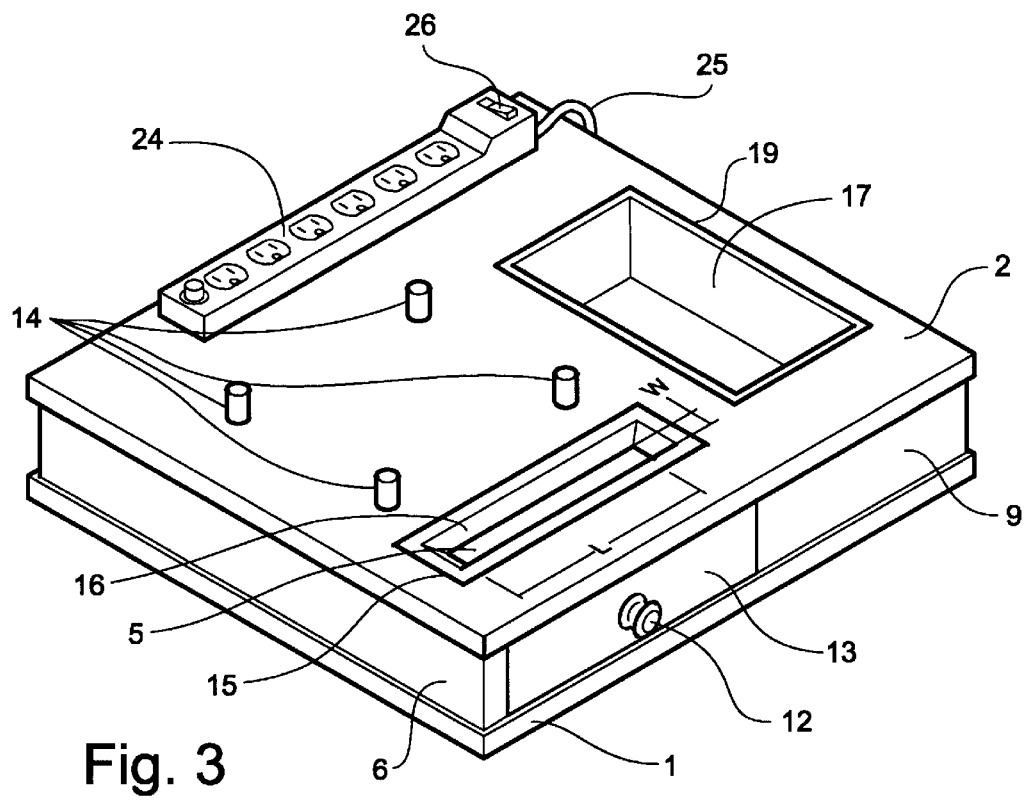
FIG. 3 is a perspective view of a grease collection system according to the present invention.
Figure 4:
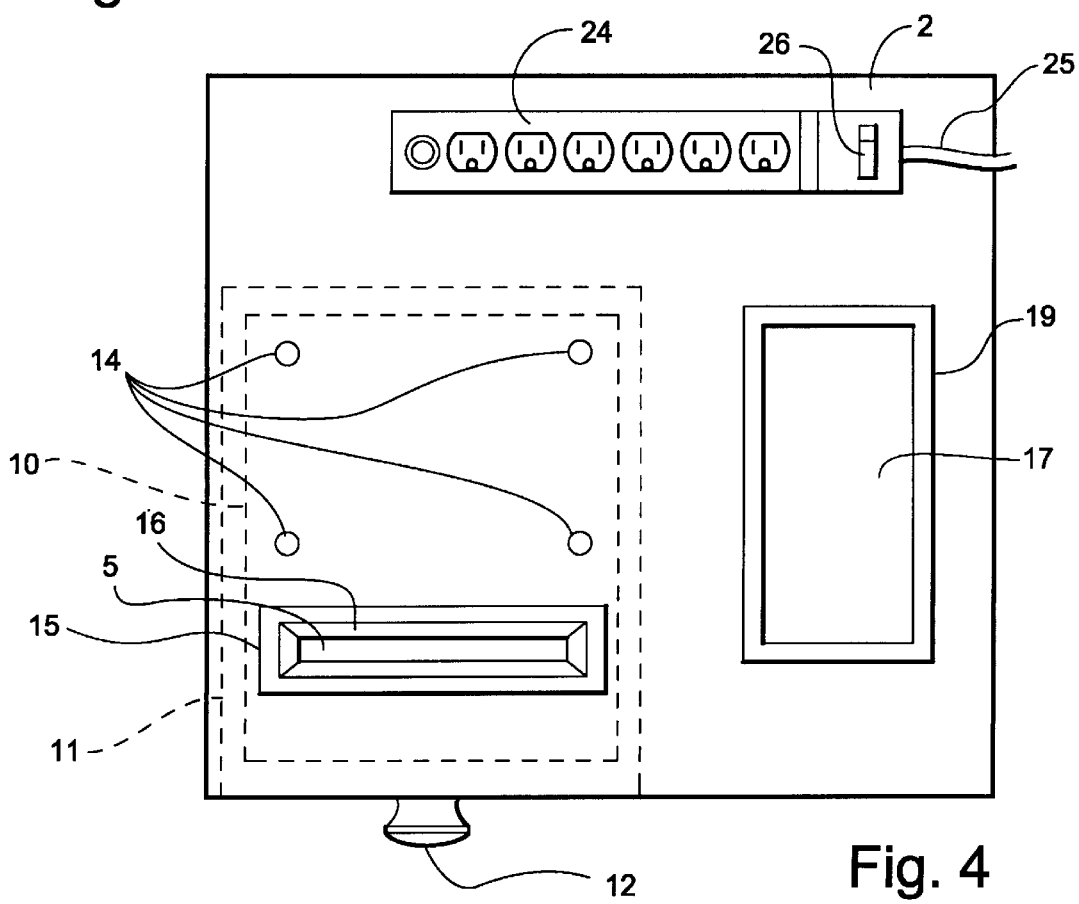
FIG. 4 is a top view of a grease collection system according to the present invention.
Figure 5:
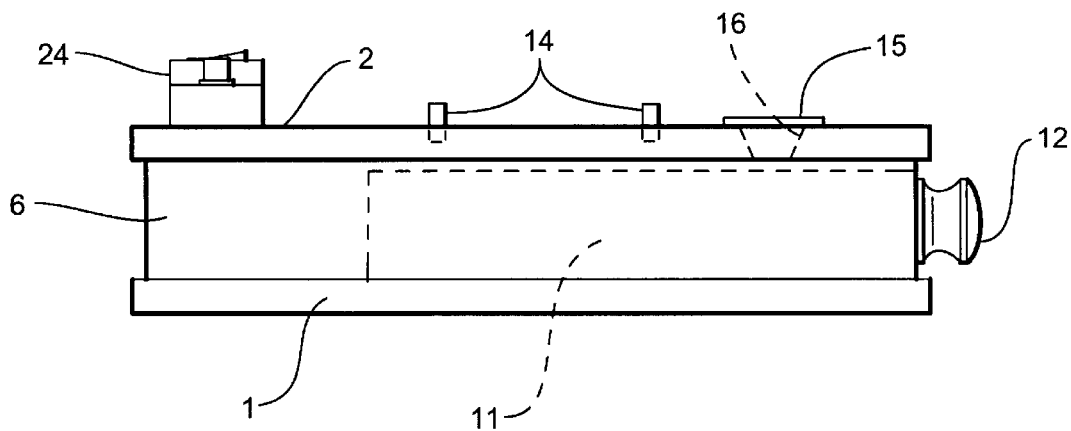
FIG. 5 is a side view of a grease collection system according to the present invention.
Figure 6:
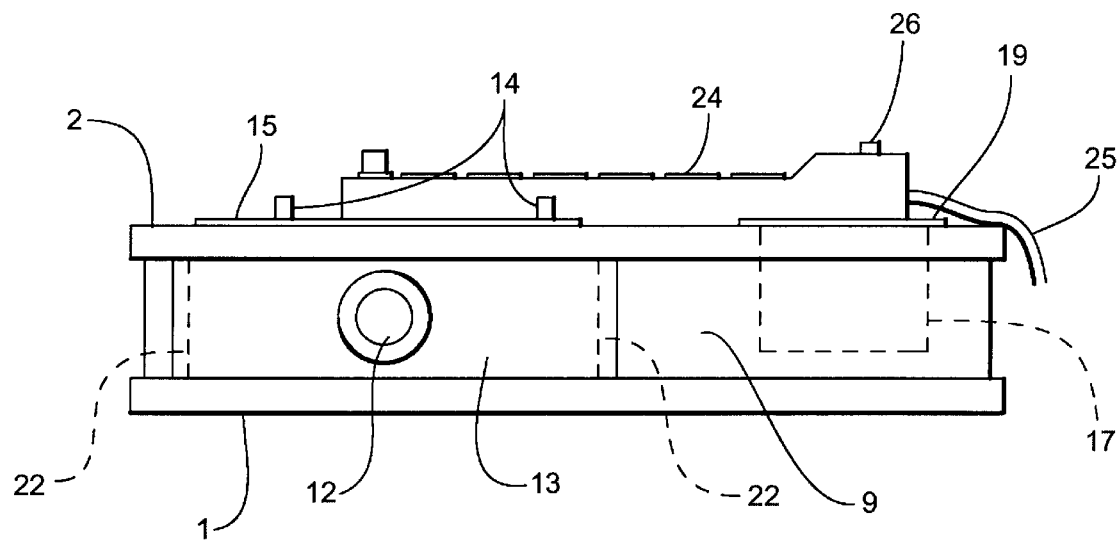
FIG. 6 is a top view of a grease collection system according to the present invention.

As illustrated most clearly in FIG. 1, cooking device 20 having grease discharge area 21 is positioned on top of a grease collection system according to the present invention as shown. Referring to FIG. 3, the preferred embodiment of a grease collection system is shown and includes top member 2 having a top side and an opposite bottom side. Extending through top member 2 from said top side to said bottom side is open slot 5 having length L and width W. In practice, grease discharge area 21 is vertically disposed above slot 5 and, ideally, length L and width W of slot 5 should be equal to or slightly greater than the corresponding dimensions of grease discharge area 21 such that all grease and other liquids passing through grease discharge area 21 will fall directly into slot 5. To further control the flow of grease and other liquids, positioned on the top side of top member 2 around the perimeter of slot 5 is grease director 15 which includes inwardly sloped inner wall 16 to assist in directing the grease and other liquids dropping from grease discharge area 21 into slot 5.

Cooking device 20 is held in position with grease discharge area 21 disposed directly above slot 5 by locator means which include a plurality of locators 14. Locators 14 may be any configuration or combination of apertures, pins, rails or the like depending upon the configuration of the particular cooking device being utilized so long as locators 14 engage such particular cooking device in a sufficient manner to locate and hold grease discharge area 21 directly above slot 5. Disposed below said bottom side of top member 2 is a plurality of sidewalls 6 and front wall 9. Bottom member 1 is disposed below said sidewalls 6 and front wall 9.

Figure 2:
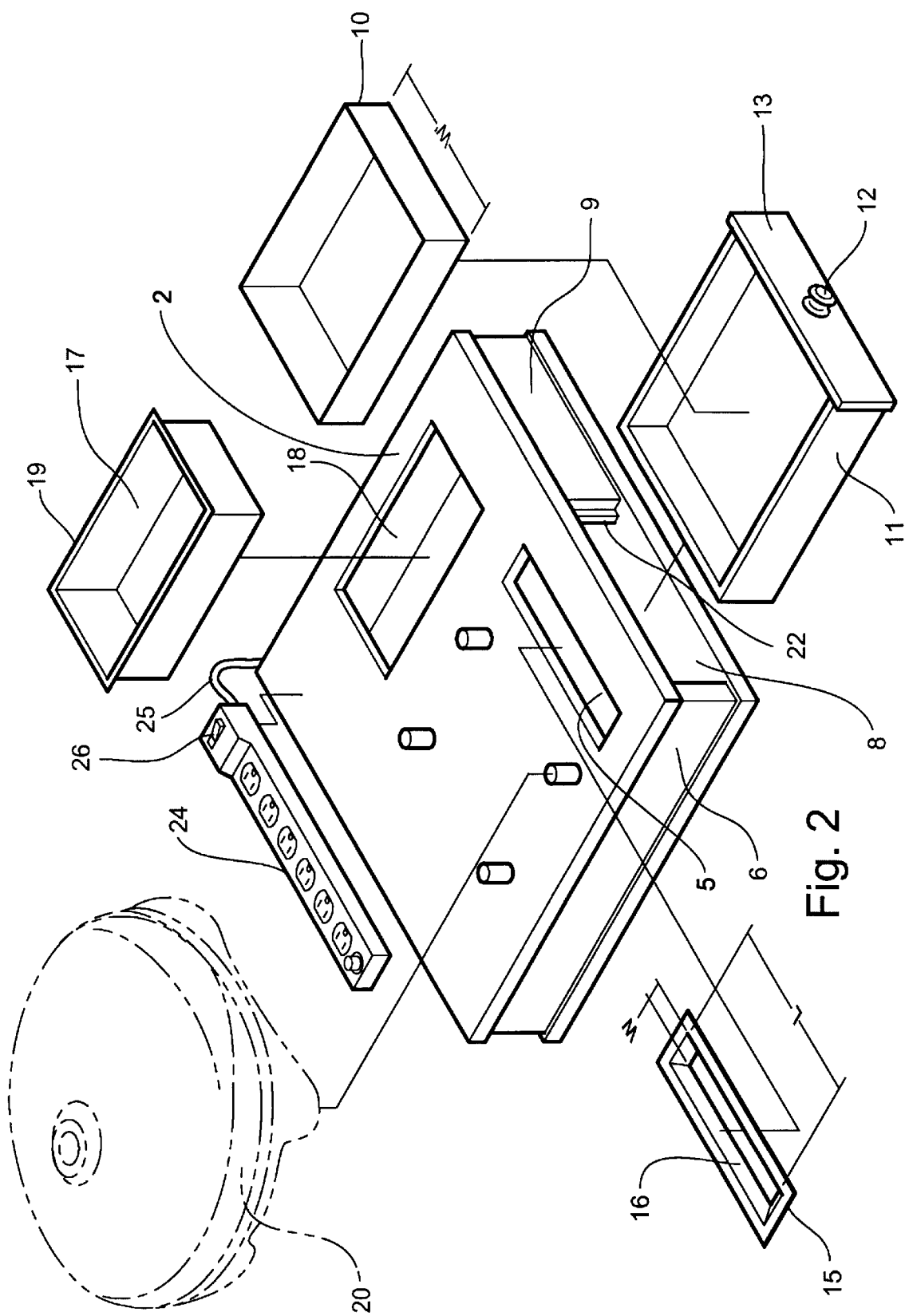
FIG. 2 is a detailed perspective view of a grease collection system according to the present invention.

Referring to FIG. 2, grease collection tray 10 has width W' which is at least slightly greater than length L of slot 5 and has such additional dimensions sufficient for grease collection tray 10 to hold a quantity of grease and other liquids released from food during a typical cooking cycle without danger of overflow or other spillage. In the preferred embodiment, grease collector tray 10 is removably positioned in drawer 11. Drawer 11 includes front face 13, said front face 13 having a front side and an opposite back side, and handle 12 mounted on the front side of front face 13. Drawer 11 is slidably mounted in aperture 8 located in front wall 9 such that, when drawer 11 is in a closed position, the back side of front face 13 engages drawer stops 22 mounted along the sides of aperture 8 and grease collection tray 10 is vertically disposed below slot 5 whereby all grease and other liquids dropping from grease discharge area 21 through slot 5 fall directly into grease collection tray 10 for collection and storage.

In practice, before the cooking process begins, cooking device 20 is positioned on the top side of top member 2 using locators 14. Grease collection tray 10 is positioned in drawer 11 which, in turn, is placed in the closed position in aperture 8 located in front wall 9. During the cooking process, grease and other liquids released from food while being cooked in cooking device 20 flow from the cooking chamber of cooking device 20 through grease discharge area 21 and fall directly through slot 5 into grease collection tray 10. When the cooking process has been completed, the operator may remove grease collection tray 10 by sliding drawer 11 out of the closed position in front wall 9 by grasping handle 12. The operator may then safely support the combination of grease collection tray 10 and drawer 11 while transporting said combination to the place where grease collection tray 10 may be safely removed from drawer 11. Grease collection tray 10 may then be emptied of the grease and other liquids and cleaned prior to being repositioned in drawer 11 for storage.

Other improvements in the preferred embodiment include utensil tray 17 useful for holding soiled utensils used during the cooking process. Utensil tray 17 is removably mounted in aperture 18 located in top member 2 adjacent to locators 14 and is supported by the top side of top member 2 by outwardly extending flange 19. A plurality of electrical outlets 24 electrically connected to power supply cord 25 may also be included either with or without on/off switch 26 to increase portability and thereby the usefulness of the present invention.

I claim:

1. A grease collection system for a cooking device designed to separate grease and other liquids from food being cooked, said cooking device having a grease discharge area, comprising:
   a. a generally horizontal top member having a top side and an opposite bottom side, said top member having an open slot extending through said top member from said top side to said bottom side, said slot being vertically disposed below said grease discharge area of said cooking device;
   b. a grease collection tray vertically disposed below said slot; and
   c. support means for said top member so that said grease collection tray may be moved horizontally relative to said top member.

2. A grease collection system as recited in claim 1 wherein said support means includes a plurality of side members, said side members being generally positioned below said top member, one of said side members having an opening through which said grease collection tray may be slidably moved relative thereto.

3. A grease collection system as recited in claim 2 further comprising a base member, said base member being positioned below said side members.

4. A grease collection system as recited in claim 2 further comprising a drawer configured to receive said grease collection tray, said drawer including a front face and a handle means, said drawer being slidably positioned in said opening in said side member, said front face being configured to engage said opening in said side member when said drawer is in a closed position.

5. A grease collection system as recited in claim 1 further comprising grease directing means positioned on aid top side of said top member along the perimeter of said slot, said grease directing means having a generally downward sloped inner side so that said grease and other liquids are directed toward said slot.

6. A grease collection system as recited in claim 1 further comprising locator means for engaging and locating said cooking device so that said cooking device is held in position with said grease discharge area vertically disposed above said slot.

7. A grease collection system as recited in claim 1 further comprising an aperture in said top member and a cooking utensil tray including an outwardly extending flange, said cooking utensil tray being removably located in said aperture with said outwardly extending flange engaging said top side of said top member to support said cooking utensil tray.

8. A grease collection system as recited in claim 1 further comprising a plurality of electric outlet means electrically connected to a power supply cord.

9. A grease collection system as recited in claim 7 further comprising a switch electrically connected in line between said electric outlet means and said power supply cord so that the flow of electricity to said electric outlet means from said power supply cord may be turned on and off thereby.

* * * * *